United States Patent

[11] 3,602,395

| [72] | Inventor | Hans F. W. Krech |
| | | Melsungen, Germany |
| [21] | Appl. No. | 874,795 |
| [22] | Filed | Nov. 7, 1969 |
| [45] | Patented | Aug. 31, 1971 |
| [73] | Assignee | Firma B. Braun |
| | | Melsungen, Germany |
| [32] | Priority | Nov. 7, 1968 |
| [33] | | Germany |
| [31] | | P 18 07 557.5 |

[54] ALTERNATE FILLING AND EMPTYING DEVICE
6 Claims, 1 Drawing Fig.

[52] U.S. Cl. ................................................. 222/64,
141/18, 137/205, 137/386
[51] Int. Cl. ............................................ B67d 5/08
[50] Field of Search ........................................ 222/52, 64;
141/18, 8, 65, 66; 356/246, 39, 181; 73/425.6, 421
B; 137/205, 386

[56] References Cited
UNITED STATES PATENTS

| 3,225,645 | 12/1965 | Baruch et al. | 356/246 |
| 3,263,554 | 8/1966 | Pickels | 356/246 |
| 3,344,702 | 10/1967 | Wood et al. | 356/246 UX |
| 3,391,598 | 7/1968 | De Grave, Jr. et al. | 356/246 |
| 3,478,598 | 11/1969 | Nielsen | 356/246 X |

*Primary Examiner*—Robert B. Reeves
*Assistant Examiner*—John P. Shannon, Jr.
*Attorney*—Watson, Cole, Grindle & Watson

ABSTRACT: An alternate filling and emptying device of a flow cuvette having filling, suction and discharge openings and a vacuum vessel with a discharge line. Electrode paths scan the state of filling and a control instrument is attached to the electrodes so that the control instrument will be operative in dependence on information from the electrode path dependent on a control program.

PATENTED AUG 31 1971　　　　　　　　　　　　　3,602,395
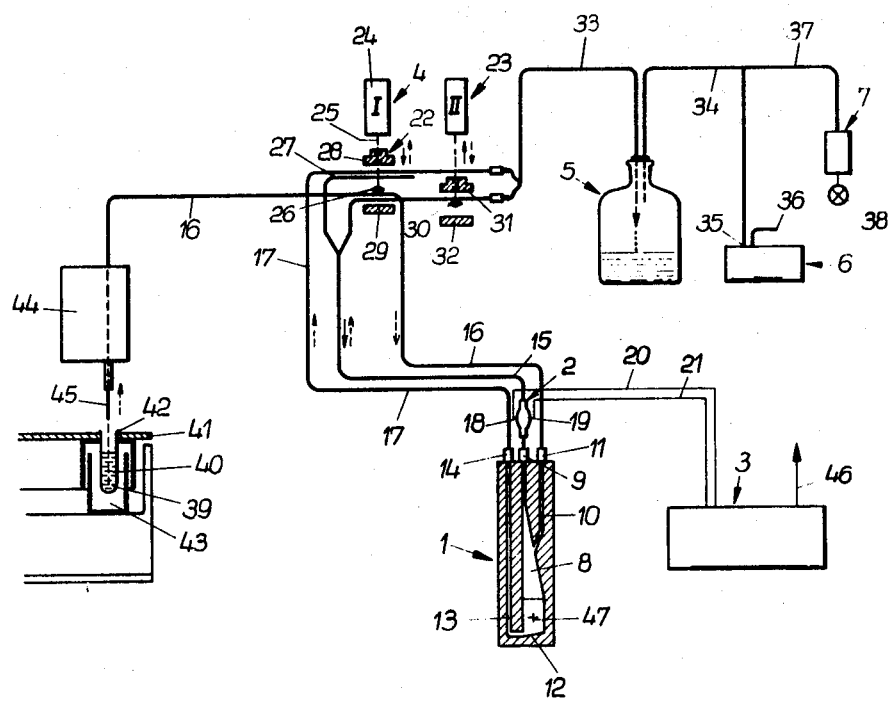
Inventor
Hans F. W. Krech
By
Watson, Cole, Grindle & Watson
Attys.

ALTERNATE FILLING AND EMPTYING DEVICE

The invention relates to an instrument for the alternate filling and emptying of a flow cuvette or container having a filling opening, a suction opening, and a discharge opening with a vacuum vessel attached to a vacuum pump, a feed pipe for the connection of the filling opening with the liquid that is to be investigated, a suction pipe for the connection of the suction opening with the vacuum vessel and a discharge pipe for the connection of the discharge opening with the vacuum vessel and with valves for the alternate closing and opening of the mentioned pipes.

In the case of use of flow cuvettes, the liquid to be investigated customarily is moved slowly through the cuvette by means of a hose pump or some other conveying device. Between the individual samples, air is pumped through the cuvette. In the case of this type of cuvette operation, mistakes of delay can develop so that remnants of the liquid investigated previously will influence the result of the measurement. Furthermore, a mistake can develop by the fact that light loss or absorption through the filled in material to be measured will not always be measured at a certain point in time, since especially in the case of small quantities of samples, the state of complete filling of the cuvette lasts only a short time.

A device of this type has also been known, with which a discontinuous filling and emptying of the measuring space of the cuvette is possible so that the state of filling of the cuvette does not change during the measurement. This device is intended for manual operation whereby a hose buckling valve is reversed as a measurement in such a manner that the cuvette is sucked empty. The ventilation in the case of the known device takes place through the suction pipe which during emptying of the cuvette, is pulled out of the sample liquid.

It is an object of the invention to provide a device of the initially mentioned category in such a way that it will permit the automatic discontinuous filling and emptying of the cuvette. By a further development of the invention, the washing of the cuvette with the liquid to be investigated in the case of the next measuring process, should likewise automatically be possible without there being any necessity to withdraw the suction pipe from the sample liquid.

According to the invention, this object is solved by the fact that an electrode path scanning the state of filling is built into the suction pipe, the electrodes of which are attached to a control device and in that the valves can be controlled by the control device in dependence on the recording of the electrode path and in dependence on a control program.

If there is liquid in the suction pipe, the electric resistance between the electrodes of the electrode path becomes less, as a result of which an impulse is transmitted to the control device which releases exit impulses with which the valves are efficiently operated. Especially, in the case of the presence of liquid in the electrode path, which is tantamount to a complete filling of the measuring space of the cuvette, the suction pipe and for practical purposes also the filling pipe are blocked so that the content of the cuvette will at first not be exchanged. The combination of an electrode path with a control device makes possible the automatic operation in such a manner that no manipulations will be required for the filling and emptying of the cuvette. Thus it will also be possible to carry out large series of measurements with a small operating expenditure.

According to a further development of the invention a ventilation pipe leading to the atmosphere branches off from the suction pipe whereby the valves are arranged and are controllable in such a manner that alternately the filling pipe and the suction pipe, on the one hand, and the discharge pipe and the ventilation pipe on the other hand, are opened or closed. In the case of such a development of the device, the filling of the cuvette will be possible in the case of one adjustment of the valves and the emptying of the cuvette in the case of one adjustment of the valves and the emptying of the cuvette in the case of the other adjustment of the valves, without there being any need in the meantime to pull out the suction pipe from the liquid sample. The emptying will be possible through the ventilation of the cuvette taking place by means of a ventilation pipe branched off especially from the suction pipe, which ventilation pipe can be closed by means of a valve. As a result thereof, a control of the device is possible in such a manner that prior to carrying out of a measurement first of all the cuvette is filled, that afterwards the cuvette is emptied, and again filled and only then will the measurement be carried out by the control device. Thus mistakes of delay can be avoided almost completely, since by the washing with that liquid which is to be investigated which precedes the measurements, the remnants of the liquid that was checked previously are completely removed or are diluted to such an extent that any influence distorting the measurement, is no longer possible.

The said mentioned arrangement of the valve can be supplemented in such a way that in case of a closed ventilation pipe and emptying pipe, the suction pipe by itself can be closed. With this, one will be able to provide that after completion of the filling one does not have to switch over immediately again to emptying, so that sufficient time will be available to carry out a measurement.

In the case of an advantageous design of the invention, a double acting valve has been provided which opens or closes alternately the emptying and ventilating pipes, on the one hand, and the filling and suction pipes, on the other hand. By the use of a double acting valve, the mentioned functions can be carried out with the aid of a single valve. If using single acting valves, then at least two, or if a valve is provided for each pipe, then four valves have to be used. In the case of the previously mentioned arrangement, according to which the suction line can be closed by itself, a single acting valve will then be provided besides the double acting valve, said single acting valve closing the suction line in one position and releasing it in the other position.

The control device can be developed such that it transmits electrical impulses which act upon the valves developed as magnetic valves. But pneumatic or hydraulic or other mechanical controls can also be used. In the latter case, cam operated valves can be used instead of the electromagnetic valves whereby the cams are built into the control device joined with the valves.

A particularly simple design will be obtained if the valves are hose valves that can be closed by compressing an elastic hose. In the case of such a development, it will be sufficient if for example, in the case of the double acting valve, an edge would press each time simultaneously on two hoses and thus pinches off the hoses.

Further objects will be apparent from the following description when considered in connection with the accompany drawing which is a diagrammatic view of the invention illustrated schematically by way of example.

The main parts of the device are a flow cuvette or trough 1, an electrode path 2, a control device 3, a ventilating arrangement 4, a collecting container 5, a vacuum pump 6 and a pressure guard or changer 7. The nature of these individual parts and their working together will be described in more detail.

The flow cuvette 1 has a measuring space 8 which is connected on top with a suction opening 9. From the measuring space 8, approximately at half its height, a pipe 10 branches off which leads to a filling opening 11. The measuring space 8 has a slanting floor 12, at the deepest point of which a pipe 13 is provided which leads to a discharge opening 14.

A suction pipe 15 is attached to the suction opening 9, a filling line 16 to the filling opening 11 and a discharge line 17 to the discharge opening 14. As already mentioned, the electrode path 2 is built into the suction pipe 15, from the electrodes of which 18 and 19 and electric lines 20 and 21 lead to the control device 3.

The ventilating arrangement 4 contains two valves, namely, a double acting valve 22 and a single acting valve 23. Both valves are electromagnetic valves with an electromagnet 24, to operate the valve 22. A connecting rod 25 is connected with the armature or rod of electromagnet 24, said rod at its lower end having been provided with a pressure element 26. Above pressure element 26 runs the discharge line 17 and ventilation pipe 27, which branches off from the suction pipe 15. Below pressure element 26 runs the filling pipe 16 and the suction pipe 15. Above pressure element 26 and pipes 27, 17, there is a pressure plate 28 and below pressure element 26 and pipes 15, 16, a pressure plate 29. It is clear that the pressure element 26 in the case of a picked-up magnet armature, presses the pipes 27 and 17 against pressure plate 28 and when the armature is released, it presses the pipes 15 and 16 against pressure plate 29. Since all pipes consist of elastic hoses at least in the area of pressure element 26 and of plates 28 and 29, one can as a result thereof achieve a blocking of the pipes.

Valve 23 has only a single action, that is to say, only one side of its pressure element 30 will act together with the suction line 15, which can be pressed against the upper pressure plate 31 by means of the pressure element 30. The lower pressure plate 32 serves in this case merely as a stop for pressure element 30.

A tube 33 communicates with the vacuum vessel 5, which tube is a continuation of the discharge line 17 as well as of the suction line 15 and another pipe 34, which is connected to the pump intake 35 of the vacuum pump 6. The pressure connection 36 of the vacuum pump empties into the open. A line 37 is branched off from line 34, which leads to the pressure guard or tank 7, which latter, has a signal lamp 38 which will flash whenever a certain pressure has been surpassed in line 37 and thus also in the inside of vacuum vessel 5.

The arrangement shown partially in the drawing on the left-hand side does not belong to the device. In the case of this arrangement, one is dealing with the installation for tempering the samples to be checked. The liquid sample 39 is in the test tubes 40 and these test tubes are held on a revolving disk 41, in which holes 42 are disposed in a graduated circle for placing in the test tubes 40. The test tubes dip into an annular channel 43, through which tempering air flows. Above the test tubes 40 a suction head 44 has been arranged which at its bottom has a hose 45 and this suction head can be lifted and lowered whereby suction hose 45 is either pulled out of the sample liquid 39 or put thereinto.

The device operates as follows:

Let it be assumed that a measurement has just been concluded and that the cuvette 1, has been emptied of the sample investigated. The suction head 44 is now lowered in a still untouched test tube 40. The control instrument 3, which controls a control program and at the same time transmits control impulses which are indicated schematically by arrow 46, will now place the double acting valve 22 in such a position that the pressure element 26 presses the two pipes 27 and 17 against the upper plate 28 and pinches them together at the same time to such a point that pipes 17 and 27 are blocked. In this position the two other pipes 15 and 16 are open and the valve 23 is likewise open. Thus suction line 15 is connected with vacuum container 5. Since filling line 16 is likewise open, the sample liquid 39 is sucked into the test tube space 8 by means of the filling line 16, the filling opening 11 and the line 10. If the testing space is filled, then the sample liquid finally will reach the electrode path 2, as a result of which a current conducting connection develops between the electrodes 18 and 19 by means of the liquid, as a result of which the control instrument 3 will be influenced in such a manner that the double acting valve 22 is deenergized which will result in the pressure element 26 jamming the pipes 15 and 16 against pressure plate 29 and thereby blocking these pipes. Since now the discharge pipe 17 is connected with the vacuum container 5, the cuvette 1, as a result thereof, will immediately be emptied again through the fact that the sample liquid is sucked through the standpipe 13, the discharge opening 14 and the discharge pipe 17 into the vacuum container 5. At the same time air can flow into the test space 8 by means of ventilation pipe 27. After this process, the cuvette has been washed and to be sure with the sample liquid which is to be checked subsequently.

The control instrument 3 now causes, in the course of its programmed control, a pull up of the double acting valve 22, whereby the lines 17 and 27 are closed again and the lines 15 and 16 are opened. Now the cuvette is again filled with sample liquid and whenever the sample liquid has penetrated to the electrode path 2, the control instrument now will be influenced in such a manner that the single acting valve 23 closes, and to be sure through the fact that the pressure element 30 presses the line 15 against the upper pressure plate 31. A further sucking in of sample liquid now is no longer possible. Valve 22 remains in the position stated, therefore continuing to block lines 17 and 27. As a result thereof, a degassing of the sample liquid takes place by a vacuum effect.

Now the light transmission of the sample liquid located in the measuring space 8 will be determined photometrically at point 47. After completion of the measurement, first of all valve 23 will return to its starting position and suction head 44 will move upwards, as a result of which suction hose 45 is pushed out of test tube 40. The quantity of liquid still remaining in the suction line will be sucked off completely. Subsequently the double acting valve 22 moves into the position in which the ventilation line 27 and the discharge line 17 are opened.

Now one will such the cuvette until empty. With this a cycle has been completed and the disk 41 which receives the test tubes 40 is now turned further by one rotational step, after which the described processes are repeated.

I claim:

1. Device for the alternate filling and emptying of a flow cuvette having a filling opening, a suction opening and a discharge opening, comprising a vacuum vessel attached to a vacuum pump, a filling line for connection of the filling opening with a liquid that is to be checked, a suction pipe connected to the suction opening with the vacuum vessel, a discharge pipe connecting the discharge opening with the vacuum vessel and having valves for the alternate closing and opening of the pipes, means providing an electrode path scanning the state of filling and provided in the suction pipe with electrodes which are attached to a control instrument, and the valves being controlled by a control instrument in dependence on the information from the electrode path and in dependence on a control program.

2. Device according to claim 1, in which a ventilation pipe is provided leading to the atmosphere and branching off from the suction lien, the valves being arranged and controllable in such a way that alternately a filling line and a suction line on the one hand, and a discharge line and a ventilating line on the other hand, are opened or closed.

3. Device according to claim 1, in which a ventilation pipe is provided leading to the atmosphere and branching off from the suction line, the valves being arranged and controllable in such a way that alternately a filling line and a suction line on the one hand, or a discharge line, and a ventilating line on the other hand, are opened or closed, and in which a double acting valve is provided which opens or closes alternately the discharge line and the ventilation line, on the one hand, or the filling line and the suction line on the other hand.

4. Device according to claim 3, in which in addition to the double acting valve, a single acting valve is provided which in one position blocks the suction line and releases it in another position.

5. Device according to claim 1, in which the control instrument transmits electric impulses which act upon the valves which are in the form of magnetic valves.

6. Device according to claim 1, in which the valves are hose valves which can be closed by compression thereon.